United States Patent
Kitajima (10) Patent No.: US 8,873,373 B2
(45) Date of Patent: Oct. 28, 2014

(54) ETHERNET TRANSMISSION METHOD, TRANSMISSION APPARATUS AND SYSTEM

(75) Inventor: Katsuya Kitajima, Tokyo (JP)

(73) Assignee: NEC Corporation, Tokyo (JP)

( * ) Notice: Subject to any disclaimer, the term of this patent is extended or adjusted under 35 U.S.C. 154(b) by 569 days.

(21) Appl. No.: 12/406,558

(22) Filed: Mar. 18, 2009

(65) Prior Publication Data

US 2009/0238089 A1 Sep. 24, 2009

(30) Foreign Application Priority Data

Mar. 18, 2008 (JP) ................................. 2008-069500

(51) Int. Cl.
*H04J 1/16* (2006.01)
*H04L 12/703* (2013.01)
*H04J 3/08* (2006.01)

(52) U.S. Cl.
CPC ................ *H04L 45/28* (2013.01); *H04J 3/085* (2013.01)
USPC ............................ 370/217; 370/221; 370/252

(58) Field of Classification Search
CPC . H04L 45/28; H04L 41/0654; H04L 41/0659; H04L 2012/5627; H04L 41/0668; H04L 1/22; H04L 12/437; H04L 12/42; H04J 3/085; H04J 2203/006
See application file for complete search history.

(56) References Cited

U.S. PATENT DOCUMENTS

| | | | | |
|---|---|---|---|---|
| 5,561,661 A | * | 10/1996 | Edmaier et al. | 370/394 |
| 5,621,722 A | * | 4/1997 | Edmaier et al. | 370/390 |
| 5,627,822 A | * | 5/1997 | Edmaier et al. | 370/218 |
| 6,654,923 B1 | * | 11/2003 | Grenier et al. | 370/216 |
| 6,853,641 B2 | * | 2/2005 | Lindhorst-Ko et al. | 370/394 |
| 7,200,107 B2 | * | 4/2007 | Kloth | 370/220 |
| 7,515,532 B2 | * | 4/2009 | Casper et al. | 370/227 |
| 7,706,255 B1 | * | 4/2010 | Kondrat et al. | 370/219 |
| 8,144,711 B1 | * | 3/2012 | Pegrum et al. | 370/225 |
| 2002/0089926 A1 | * | 7/2002 | Kloth | 370/220 |
| 2003/0231583 A1 | * | 12/2003 | Boduch et al. | 370/219 |
| 2008/0013550 A1 | | 1/2008 | Yamauchi | |
| 2008/0031129 A1 | * | 2/2008 | Arseneault et al. | 370/218 |

FOREIGN PATENT DOCUMENTS

| | | |
|---|---|---|
| JP | 1996237253 A | 9/1996 |
| JP | 2000196603 A | 7/2000 |
| JP | 2001103069 A | 4/2001 |

(Continued)

OTHER PUBLICATIONS

Japanese Office Action for JP2008-069500 mailed on Sep. 11, 2012.

*Primary Examiner* — Steven H Nguyen
(74) *Attorney, Agent, or Firm* — Sughrue Mion, PLLC (57) ABSTRACT

The present invention, provides an Ethernet transmission apparatus comprising a first and second MEPs provided for each of transmission lines of operational and non-operational systems and for performing the transmission/reception of a frame to be transmitted over each transmission line in a duplexed manner, and a switching processing part for switching the MEP to be used for reception by using ETH-CC which is transmitted at regular intervals, in which the above described first and second MEPs are configured to be able to confirm each other's received content and are adapted to add a continuous sequence number to the ETH-CC when transmitting the ETH-CC, and when the sequence number of the received ETH-CC is smaller than the sequence number of the ETH-CC received by the operational system side, the MEP of the non-operational system side is adapted not to transmit the frame.

9 Claims, 7 Drawing Sheets

(56) References Cited

FOREIGN PATENT DOCUMENTS

| | | | |
|---|---|---|---|
| JP | 2002354011 A | 12/2002 | |
| JP | 2006174406 A | 6/2006 | |
| JP | 2008022337 A | 1/2008 | |
| JP | 2008028671 A | 2/2008 | |

* cited by examiner

Fig.2

| | 1 | | | | | | | | 2 | | | | | | | | 3 | | | | | | | | 4 | | | | | | | |
|---|---|---|---|---|---|---|---|---|---|---|---|---|---|---|---|---|---|---|---|---|---|---|---|---|---|---|---|---|---|---|---|---|
| | 8 | 7 | 6 | 5 | 4 | 3 | 2 | 1 | 8 | 7 | 6 | 5 | 4 | 3 | 2 | 1 | 8 | 7 | 6 | 5 | 4 | 3 | 2 | 1 | 8 | 7 | 6 | 5 | 4 | 3 | 2 | 1 |
| 1 | MEL | | | Version(0) | | | | | OpCode(CCM=1) | | | | | | | | Flags | | | | | | | | TLV Offset(70) | | | | | | | |
| 5 | Sequence Number(0) | | | | | | | | | | | | | | | | | | | | | | | | | | | | | | | |
| 9 | MEP ID | | | | | | | | | | | | | | | | | | | | | | | | | | | | | | | |
| 13 | MEG ID(48 octets) | | | | | | | | | | | | | | | | | | | | | | | | | | | | | | | |
| 17 | | | | | | | | | | | | | | | | | | | | | | | | | | | | | | | | |
| 21 | | | | | | | | | | | | | | | | | | | | | | | | | | | | | | | | |
| 25 | | | | | | | | | | | | | | | | | | | | | | | | | | | | | | | | |
| 29 | | | | | | | | | | | | | | | | | | | | | | | | | | | | | | | | |
| 33 | | | | | | | | | | | | | | | | | | | | | | | | | | | | | | | | |
| 37 | | | | | | | | | | | | | | | | | | | | | | | | | | | | | | | | |
| 41 | | | | | | | | | | | | | | | | | | | | | | | | | | | | | | | | |
| 45 | | | | | | | | | | | | | | | | | | | | | | | | | | | | | | | | |
| 49 | | | | | | | | | | | | | | | | | | | | | | | | | | | | | | | | |
| 53 | | | | | | | | | | | | | | | | | | | | | | | | | | | | | | | | |
| 57 | TxFCf | | | | | | | | | | | | | | | | | | | | | | | | | | | | | | | |
| 61 | RxFCb | | | | | | | | | | | | | | | | | | | | | | | | | | | | | | | |
| 65 | TxFCb | | | | | | | | | | | | | | | | | | | | | | | | | | | | | | | |
| 69 | Reserved(0) | | | | | | | | | | | | | | | | | | | | | | | | | | | | | | | |
| 73 | End TLV(0) | | | | | | | | | | | | | | | | | | | | | | | | | | | | | | | |

ETHERNET TRANSMISSION METHOD, TRANSMISSION APPARATUS AND SYSTEM

This application is based upon and claims the benefit of priority from Japanese patent application No. 2008-069500, filed on Mar. 18, 2008, the disclosure of which is incorporated herein in its entirety by reference.

BACKGROUND OF THE INVENTION

1. Field of the Invention

The present invention relates to an Ethernet transmission apparatus which has a function of switching an operational system and non-operational system, and particularly to an Ethernet transmission apparatus for preventing the same frame from being transmitted multiple times.

2. Description of the Related Art

In the 1+1 Bidirectional mode of Ethernet Linear Protection recommended in ITU-T G.8031, the connection between transmission apparatuses is duplexed by Working/Protection transmission lines which serve as operational/non-operational systems, and either one of the Working/Protection transmission lines is selected to be used for transmission depending on the status of the transmission line.

The transmission side MEP (Maintenance group End Point) transmits ETH-CC (Continuity Check) at regular intervals to both of the Working/Protection transmission lines independently, and the receiving side administers only the status of the transmission lines by using ETH-CC and performs switching of the transmission lines according to an alarm state.

Transmission technologies which exploit the switching of operational and non-operational systems include those disclosed in Japanese Patent Laid-Open No. 2006-174406, Japanese Patent Laid-Open No. 2002-354011, and Japanese Patent Laid-Open No. 08-237253.

Japanese Patent Laid-Open No. 2006-174406 discloses a method and apparatus which aims at realizing highly-reliable failure recovery without packet loss. Specifically, there is disclosed in FIG. 28 and Paragraph 0125, which refers to FIG. 28, a configuration in which a counter is transmitted into Inter Frame Gap (IFG) to measure the counter delay difference between active and standby systems so that the slower one is discarded.

Japanese Patent Laid-Open No. 2002-354011 discloses a technique which aims at performing switching of the transmission line without causing loss and unsynchronized switching of undefined packet lengths in a duplexed switching system in which the undefined packet lengths are mapped to SDH (Synchronous Digital Hierarchy) frames, the technique being configured such that the same SDH frame in which an undefined length packet is inserted into a payload portion according to the timing based on the phase of the SDH frame is transmitted through the operational and non-operational systems.

Japanese Patent Laid-Open No. 08-237253 discloses a technique which also aims at realizing synchronized switching without instantaneous interruption when switching duplexed, active and standby virtual paths as with the technique of Japanese Patent Laid-Open No. 2002-354011, and in which an OAM (Operation Administration and Maintenance) cell to which a sequence number and an identification code for the necessity of switching have been added is intermittently transmitted over duplex virtual paths, and the sequence number is checked to detect differential delay and loss of OAM cell so that synchronization is established and the virtual paths are switched.

Among the techniques described in each of the above described patent documents, the technique disclosed in Japanese Patent Laid-Open No. 2006-174406 utilizes IFG and cannot be used in general Ethernet networks. Moreover, configuring the technique disclosed in Japanese Patent Laid-Open No. 2006-174406, in which an identifier is given to each frame, requires complicated processing and the transfer operation requires much time.

The techniques disclosed in Japanese Patent Laid-Open No. 2002-354011 and Japanese Patent Laid-Open No. 08-237253 aim at the realization of synchronized switching, and detection of packet loss is a common problem in each of the patent documents.

In Ethernet, in the case of a duplex system (1+1 Protection), even if a packet disappears during the switching of operational/non operational system, the disappeared packet that disappeared can be recovered in an upper layer and therefore will not cause a serious problem.

When there is a difference in propagation time between each of the Working/Protection transmission lines due to a path length difference, a Node number difference and the like, the same frame will not be received at the receiving side at the same time. When switching is performed from the Working side to the Protection side with the Protection side being delayed, the same frame will be invariably outputted from the receiving side. Occurrence of redundant packets will cause the transmission line to be crowded, resulting in congestion. Since such a redundant packet problem, in which two or more of the same packets are received, is not taken into account in Ethernet, it is an essential problem to be avoided.

3. Summary of the Invention

It is an object of the present invention to provide a technique for preventing a plurality of the same frames from being received during the switching of operational/non-operational systems at the time of a malfunction of an Ethernet configured for redundancy.

The Ethernet transmission apparatus of the present invention comprises a first and second MEP provided for each of the transmission lines of operational/non-operational systems and for performing the transmission/reception of a frame to be transmitted over each transmission line in a duplexed manner, and a switching processing part for switching the MEP to be used for reception by using ETH-CC which is transmitted at regular intervals, and the Ethernet transmission apparatus is characterized in that the above described first and second MEPs are configured to be able to confirm each other's received content, and are adapted to add a continuous sequence number to the ETH-CC when transmitting the ETH-CC, and that, when the sequence number of the received ETH-CC is smaller than the sequence number of the ETH-CC received by the operational system side, the MEP of the non-operational system side is adapted not to transmit the above described frame.

The Ethernet transmission system of the present invention comprises the above described Ethernet transmission apparatus and transmission lines for operational and non-operational systems.

The Ethernet transmission method of the present invention is performed in an Ethernet transmission apparatus comprising a first and second MEPs provided for each of the transmission lines of operational and non-operational systems, for performing the transmission/reception of a frame to be transmitted over each transmission line in a duplexed manner, and configured to be able to confirm each other's received content, and a switching processing part for switching the MEP to be used for reception by using ETH-CC which is transmitted at regular intervals, and the transmission method is characterized by comprising:

configuring the above described first and second MEPs to add a continuous sequence number to the above described ETH-CC when transmitting the above described ETH-CC; and adapting the MEP of the non-operational system side not to transmit the above described frame when the sequence number of the received ETH-CC is smaller than the sequence number of the ETH-CC received by the operational system side.

In the present invention configured as described above, since the MEP which receives ETH-CC having a smaller sequence number does not transmit the frame, the frame to be sent to the switching processing part will be a newer frame having a larger sequence number. As the result of this, there will be no chance that frames of the same content will be sent to the switching processing part, and thereby a rapid transfer of frames is enabled.

BRIEF DESCRIPTION OF THE DRAWINGS

FIG. 4 shows transmission apparatus 200 in FIG. 1, in which

EXEMPLARY EMBODIMENT

Figure 1:
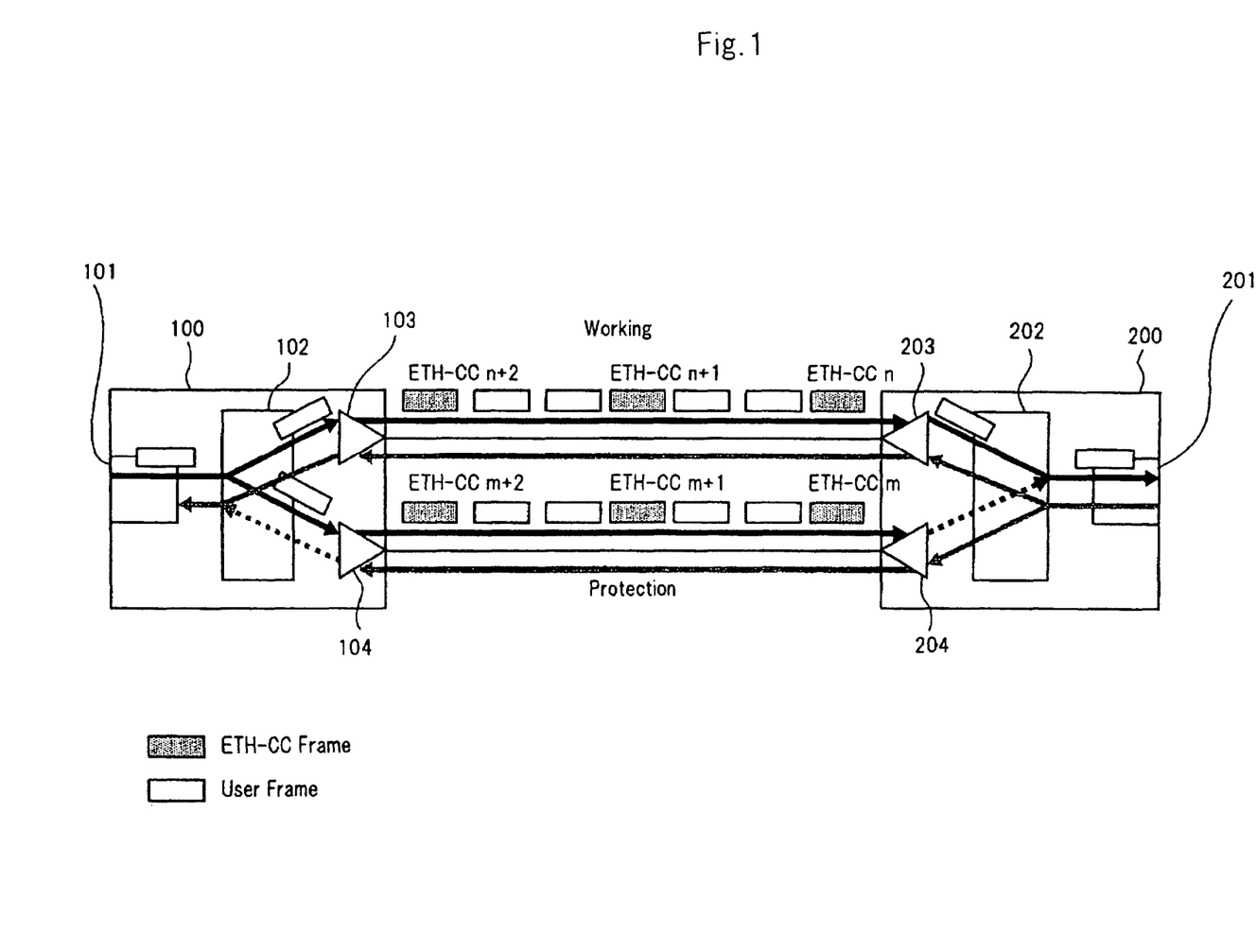
FIG. 1 is a block diagram to show the configuration of an exemplary embodiment of the present invention.

Next, an exemplary embodiment of the present invention will be described with reference to drawings. FIG. 1 is a block diagram to show the configuration of the exemplary embodiment of the system according to the present invention.

The present exemplary embodiment shows a transmission state between transmission apparatus 100 and transmission apparatus 200, which constitute part of a transmission system. Transmission apparatus 100 comprises user frame input/output part 101, switching processing part 102, and MEPs 103 and 104; transmission apparatus 200 comprises user frame input/output frame 201, switching processing part 202, and MEPs 203 and 204.

Transmission apparatus 100 and transmission apparatus 200 are configured to operate in the 1+1 Bidirectional mode of Ethernet Linear Protection recommended by ITU-T G.8031 and are connected in a duplexed and bidirectional manner by Working/Protection transmission lines which serve as operational/non-operational side transmission lines. MEPs 103 and 203 are provided for the Working transmission line, and MEPs 104 and 204 are provided for the Protection transmission line.

The MEP established at transmission side transmits ETH-CC (Continuity Check) at regular intervals. The transmission side MEP is provided in both of the Working/Protection transmission lines, and the transmission timing is fully synchronized. As the result of this, ETH-CC is transmitted to both of the Working/Protection transmission lines at the same timing, and the same User Frame is transmitted between ETH-CC frames on both sides.

Figure 2:
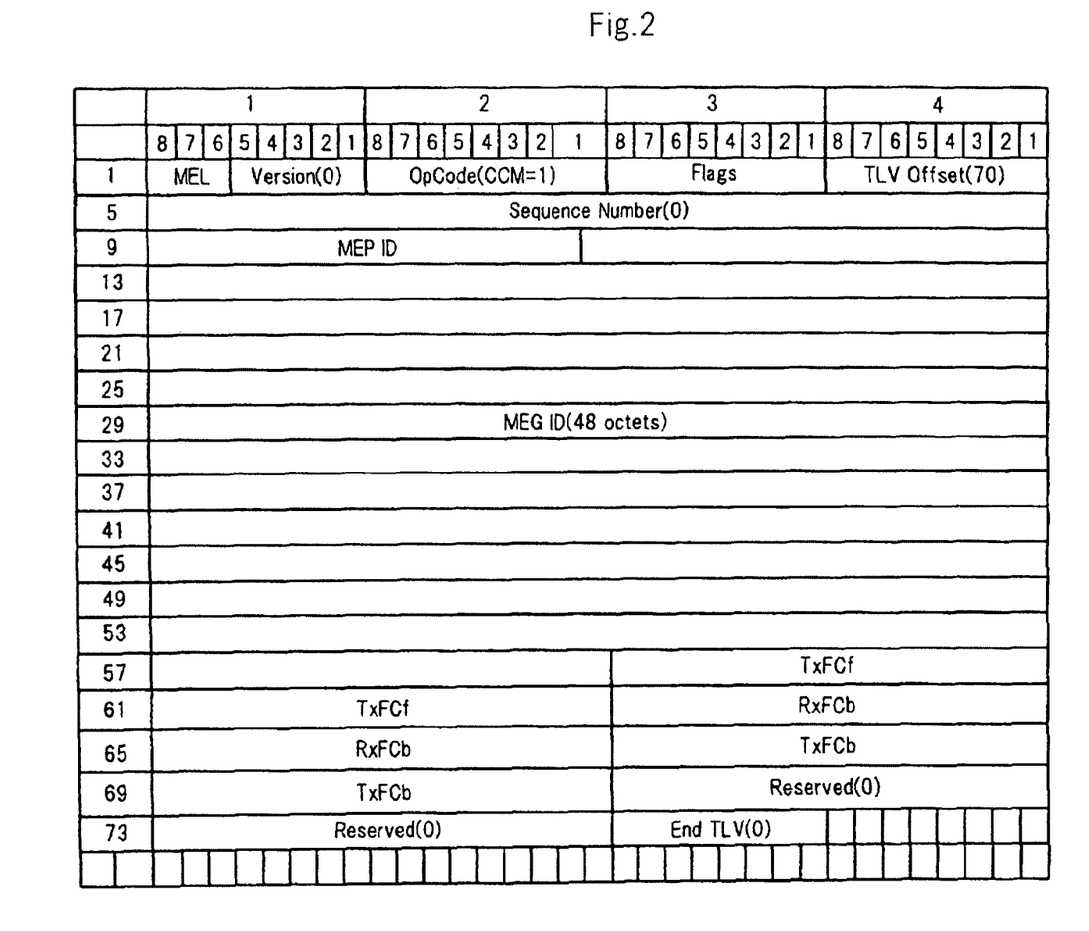
FIG. 2 shows a PDU Format of ETH-CC to be used in the exemplary embodiment shown in FIG. 1.

FIG. 2 is a diagram to show a PDU (Protocol Data Unit) Format of ETH-CC used in the present exemplary embodiment. Although, a Sequence Number is unused in FIG. 2, the area from 5 to 8 bytes is used as Sequence Number in the present exemplary embodiment.

The MEP established at the receiving side MEP receives Frame on both of the Working/Protection transmission lines and checks the Sequence Number of ETH-CC. The non-operational side (the Protection side in this case) MEP checks the Sequence Numbers of the operational/non-operational sides and, when the Sequence Number of non-operational side is smaller than the Sequence Number of the operational side, it will not transfer a User Frame to the switching processing part. When the Sequence Number of the non-operational side is larger than the Sequence Number of the operational side, the User Frame is transferred to the switching processing part. Further, the MEP established at the receiving side MEP monitors the status of each line by monitoring ETH-CC, and in the event of an abnormal incidence, it will make notification to the switching processing part. The switching processing part performs switching processing depending on the line state from the MEP established at the receiving side.

Figure 3:
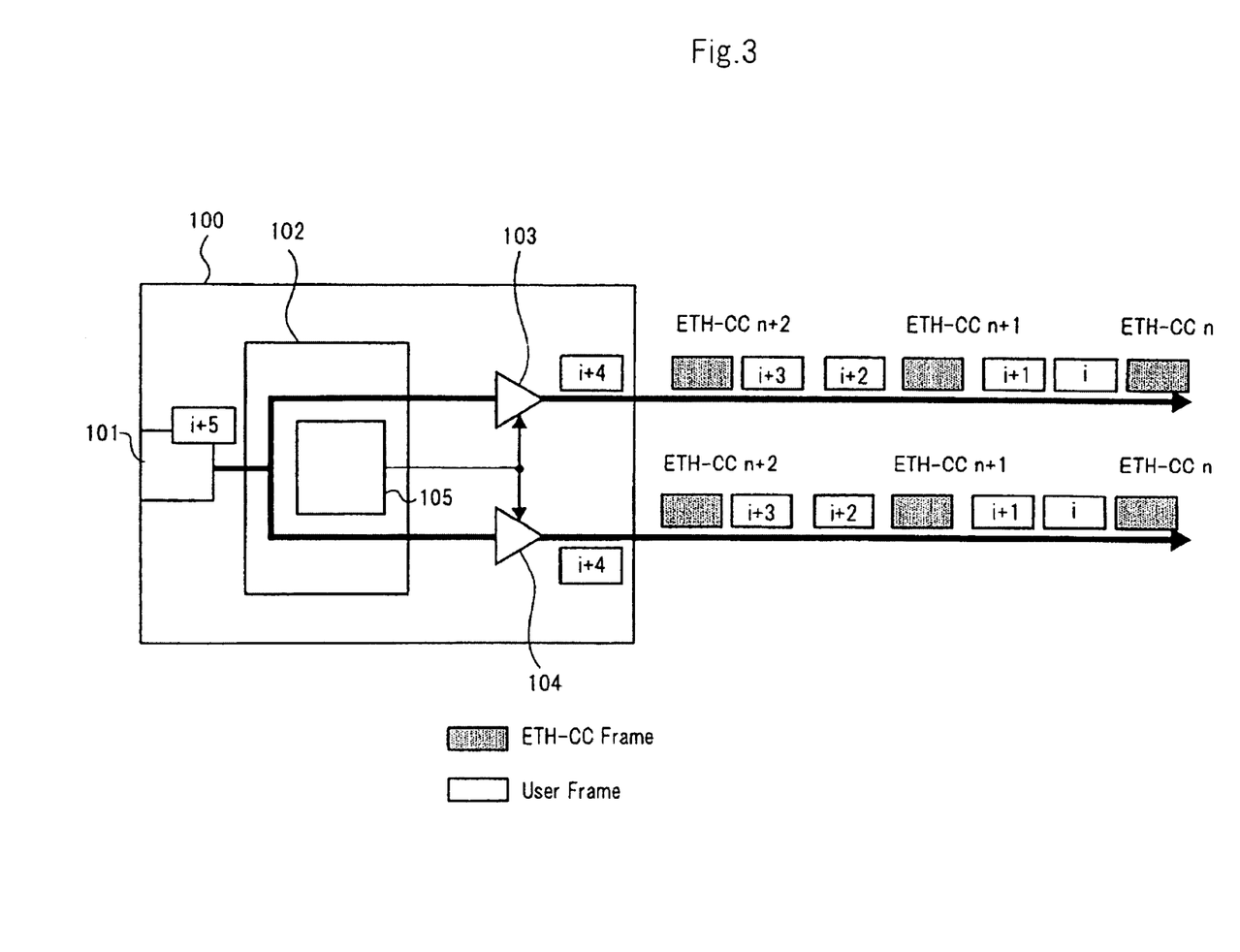
FIG. 3 shows transmission apparatus 100 in FIG. 1 as the transmission side.

FIG. 3 is a diagram to show transmission apparatus 100 as the transmission side and, hereinafter, the processing of the transmission side will be described with reference to FIG. 3.

User frame input/output part 101 receives a frame from a user and transfers it to switching processing part 102. At switching processing part 102, copying is performed for transferring the user frame to the Working and Protection transmission lines. Each of MEPs 103 and 104 transmits ETH-CC over the Working and Protection transmission lines at regular intervals.

Switching processing part 102 comprises synchronization circuit 105 for outputting a timing signal, and each of MEPs 103 and 104 transmits ETH-CC and User Frame in a synchronous manner based on the timing signal from synchronization circuit 105 at the time of transmission. At that moment, ETH-CC is added with the same Sequence Number and the relationship of the order in which the ETH-CC and User Frame are controlled to be identical. ETH-CC and User Frame are set to have the same VLAN/Priority so that the order in which the frames are transferred will not be changed in the redundant section.

FIG. 4 is a diagram to show transmission apparatus 200 as the receiving side and, hereinafter, processing on the receiving side will be described in detail with reference to FIG. 4.

Figure 4A:
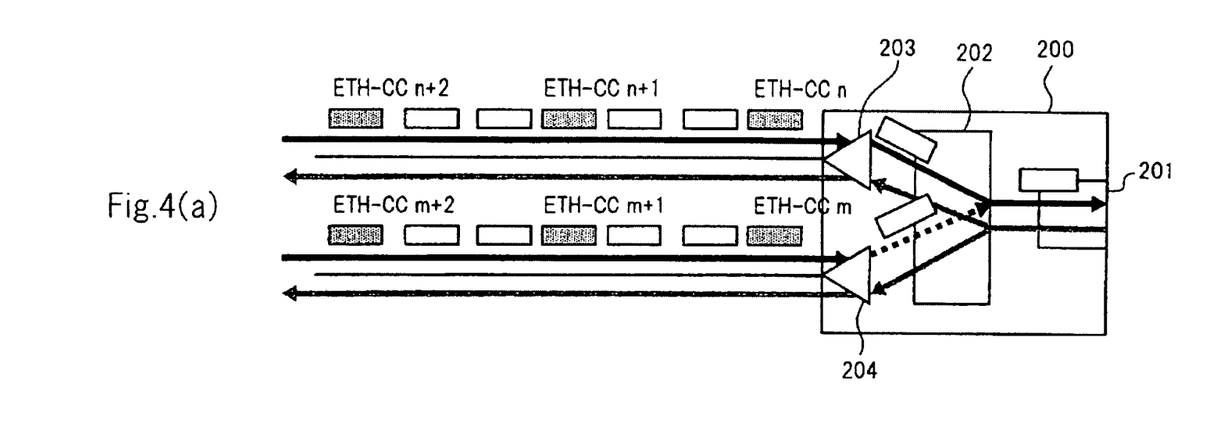
FIG. 4(a) shows the case in which the relationship between n, which is the Sequence Number of ETH-CC that transmits through the Working side, and m, which is the Sequence Number of ETH-CC that transmits through the Protection side, is n<m.
Figure 4B:
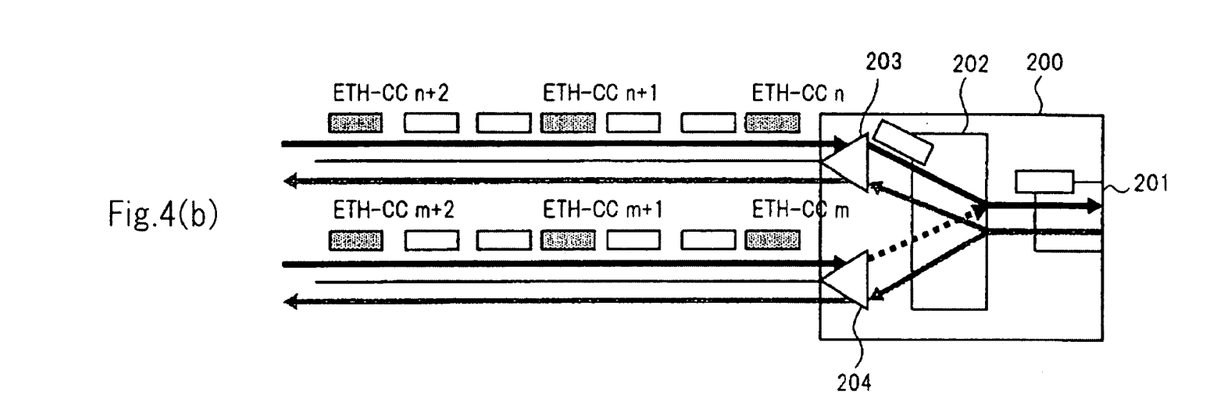
FIG. 4(b) shows the case in which n≥m.

FIG. 4(a) shows the case in which the relation between n, which is the Sequence Number of ETH-CC that is transmitted through the Working side, and m, which is the Sequence Number of ETH-CC that is transmitted through the Protection side, is n<m, and FIG. 4(b) shows the case in which n≥m.

MEPs 203 and 204 receive ETH-CC and confirm the Sequence Number to monitor the status of the Working/Protection transmission lines. MEPs 203 and 204, which are connected with each other and which are aware of each other's reception state, compare both Sequence Numbers of the Working/Protection transmission lines and will not transmit a User Frame to switching processing part 202 if the value of a Sequence Number of the non-selected system is smaller.

On the other hand, when the value of the Sequence Number of the non-selected system is larger, a User Frame is transmitted to switching processing part 202. Since it has not been selected in practice, the User Frame will not be outputted.

Switching processing part 202 selects a selected system based on the line state information from each of MEPs 203 and 204 of the Working/Protection transmission lines and performs a switching operation.

Since the Ethernet OAM technology that uses MEP and the Ethernet Linear Protection technique themselves have been recommended by ITU-T and are not directly related to the present exemplary embodiment, the detailed configurations thereof will be omitted.

Next, the switching operation by switching processing part 202 will be described with reference to FIGS. 5 to 7.

Hereafter, description will be made on the operation when the Working side, is selected and switched to the Protection side.

Figure 5:
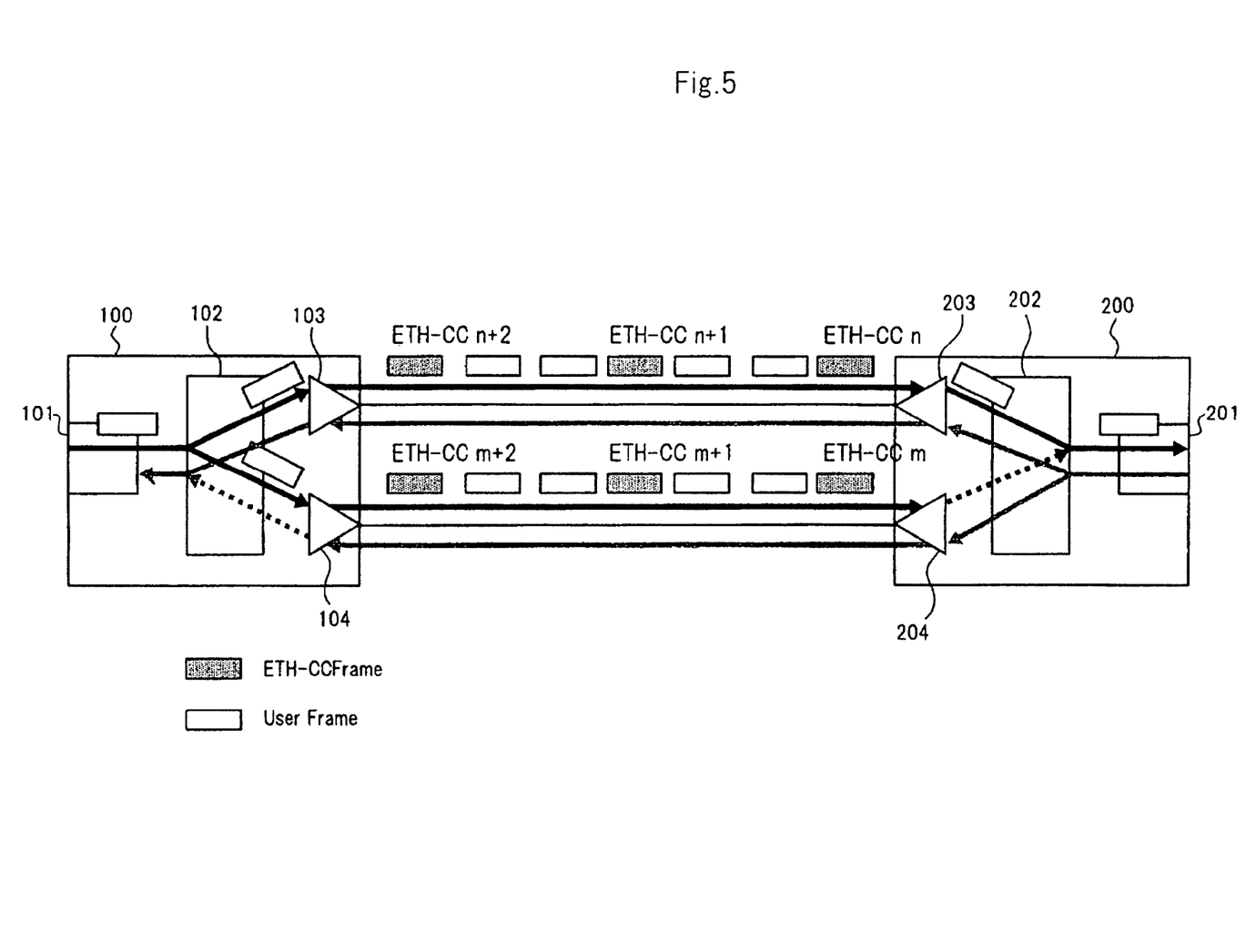
FIGS. 5 to 7 show diagrams to illustrate the switching operation by switching processing part 202 in FIG. 1.

FIG. 5 shows a normal state. Although Ethernet is based on a two-way communication, only one way (left to right) will be shown herein for the sake of simplicity. Although, in normal times, frames are received through both of the Working/Protection transmission lines, the reception timing will be different at MEPs 203 and 204 of the receiving side due to conditions such as path length and the like. It is shown that when ETH-CC whose Sequence Number is n is received at the Working side, ETH-CC whose Sequence Number is m will have been received at the Protection side.

At the receiving side, administration of the Sequence Number is conducted to determine whether or not the transfer of a User Frame of the non-operational system (Protection side in this case) is allowed. The switching control part selects a signal of the selected system (Working side in this case) and outputs the User Frame.

Figure 6:
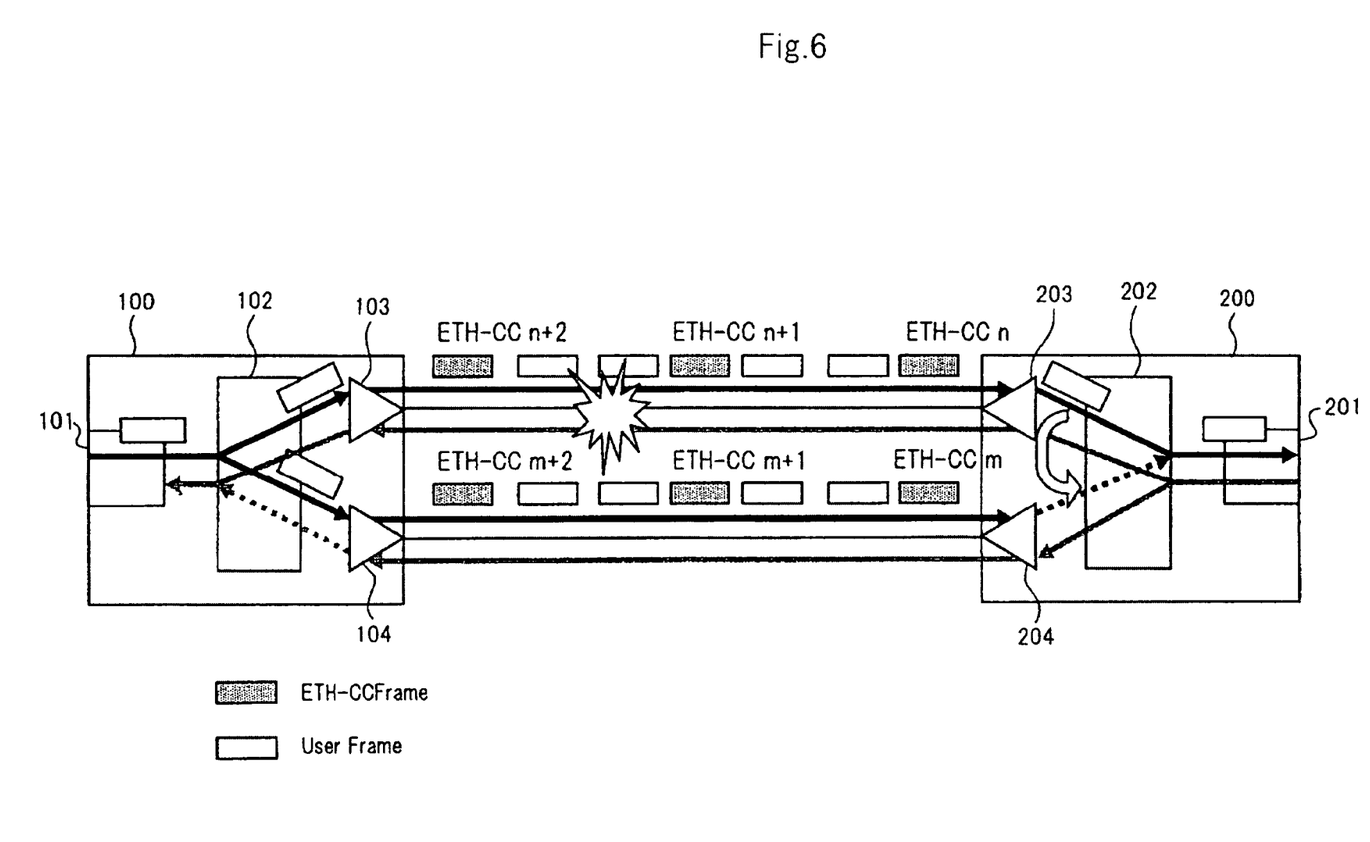
Figure 7:
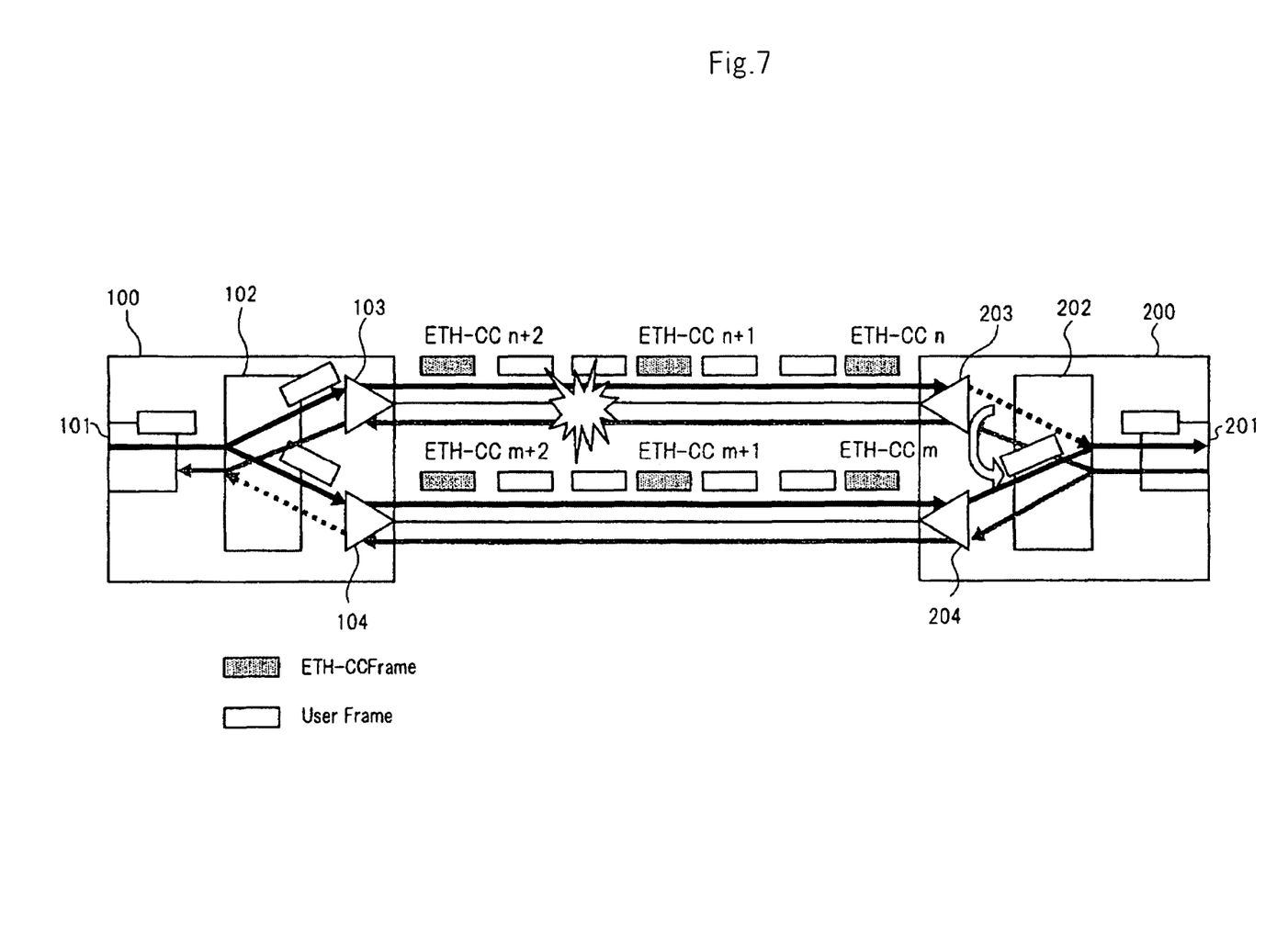

FIG. 6 shows a state when a malfunction takes place on the Working side.

MEP 203 of the Working side detects a malfunction (LOC: Loss of Continuity Check) and passes the information to switching processing part 202. Switching processing part 202 performs switching according to the malfunction state thereby switching the selected system to the Protection side. MEP 204 of the Protection side checks the Sequence Number of ETH-CC and halts the transmission of User Frame to switching processing part 202 until ETH-CC that has a newer Sequence Number than that of the former selected system is received.

At the time of malfunction, since the reception of ETH-CC at the Working side is stopped, the Sequence Number on the Working side will not be counted up and will be stopped at a certain value. Since, on the Protection side, ETH-CC is received at regular intervals, as in normal times, the Sequence Number received by the Protection side will be renewed. At this moment, MEP 204 of the Protection side starts the transfer of the User Frame, and the User Frame will be outputted from the Protection side as shown in FIG. 7.

As described so far, in the present exemplary embodiment, by controlling the non-operational system to transmit only those User Frames which are newer than those from the operational system by using the Sequence Number, it becomes possible to inhibit a plurality of the same frames as User Frame from being outputted at the time of switching operation, thereby preventing the transmission path from being congested.

Advantages according to the present exemplary embodiment are as follows.

Since no special purpose frame header is used, it is possible to achieve the recommended functions with some enhancements.

The configuration to inhibit a plurality of the same frames from being outputted at the time of the switching operation can be used in upper layers without paying any concern to switching.

The configuration to inhibit a plurality of the same frames from being outputted even when a 1+1 switching scheme is used makes it possible to use the 1+1 switching scheme which enables faster switching.

Since the prevention of packet loss is not intended, there is no need to provide an extra buffer in the switching processing part of the receiving side.

Since there is no need of buffering according to the above described reason, the occurrence of delay associated with buffering will be restricted.

Since a mechanism is adopted in which aside from the user frame, a Sequence Number area (currently unused) in an ETH-CC packet is used as the sequence number and thereby the phase difference between the both systems is detected, there is no need for the user frame to be processed.

The control of transmission of user frame to the switching part and the disposal thereof in normal times (ordinary times) needs to be performed only for the standby system.

While this invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An Ethernet transmission apparatus comprising a first and second maintenance group end point (MEP) provided for each of the transmission lines of the operational/non-operational systems and for performing the transmission/reception of a frame to be transmitted over each transmission line in a duplexed manner, and a switching processing part for switching the MEP to be used for reception by using Ethernet-continuity check (ETH-CC) which is transmitted at regular intervals, the Ethernet transmission apparatus being characterized in that the above described first and second MEPs are configured to be able to confirm each other's received content and are adapted to add a continuous sequence number to said ETH-CC when transmitting said ETH-CC, and that when the sequence number of the received ETH-CC is smaller than the sequence number of the ETH-CC received by the MEP of the operational system side, the MEP of the non-operational system side is adapted not to transmit said frame, wherein the switching processing part switches the MEP without using any buffers.

2. The Ethernet transmission apparatus according to claim 1, wherein said switching processing part comprises a synchronization circuit for outputting a timing signal to said first and second MEPs and is adapted to copy an inputted frame and transmit said frame to said first and second MEPs, and wherein each of said first and second MEPs synchronizes said ETH-CC and said frame in response to said timing signal and outputs said ETH-CC and said frame to the transmission lines of said operational and non-operational systems.

3. The Ethernet transmission apparatus according to claim 1, wherein each of said first and second MEPs transmits a received frame to said switching processing part, and said switching processing part transmits a frame from the MEP of the system used for reception.

4. The Ethernet transmission apparatus according to claim 2, wherein
each of said first and second MEPs transmits a received frame to said switching processing part, and said switching processing part transmits a frame from the MEP of the system used for reception.

5. An Ethernet transmission system, comprising the Ethernet transmission apparatus and operational and non-operation transmission lines, wherein
said Ethernet transmission apparatus comprising a first and second maintenance group end point (MEP) provided for each of the transmission lines of the operational/non-operational systems and for performing the transmission/reception of a frame to be transmitted over each transmission line in a duplexed manner, and a switching processing part for switching the MEP to be used for reception by using Ethernet-continuity check (ETH-CC) which is transmitted at regular intervals, the Ethernet transmission apparatus being characterized in that
the above described first and second MEPs are configured to be able to confirm each other's received content and are adapted to add a continuous sequence number to said ETH-CC when transmitting said ETH-CC, and that when the sequence number of the received ETH-CC is smaller than the sequence number of the ETH-CC received by the MEP of the operational system side, the MEP of the non-operational system side is adapted not to transmit said frame,
wherein the switching processing part switches the MEP without using an buffers.

6. The Ethernet transmission system according to claim 5, wherein
said switching processing part comprises a synchronization circuit for outputting a timing signal to said first and second MEPs and is adapted to copy an inputted frame and transmit said frame to said first and second MEPs, and wherein
each of said first and second MEPs synchronizes said ETH-CC and said frame in response to said timing signal and outputs said ETH-CC and said frame to the transmission lines of said operational and non-operational systems.

7. The Ethernet transmission system according to claim 5, wherein
each of said first and second MEPs transmits a received frame to said switching processing part, and said switching processing part transmits a frame from the MEP of the system used for reception.

8. The Ethernet transmission system according to claim 7, wherein
each of said first and second MEPs transmits a received frame to said switching processing part, and said switching processing part transmits a frame from the MEP of the system used for reception.

9. An Ethernet transmission method performed in an Ethernet transmission apparatus comprising a first and second maintenance group end point (MEP) provided for each of the transmission lines of the operational and non-operational systems, for performing the transmission/reception of a frame to be transmitted over each transmission line in a duplexed manner, and configured to be able to confirm each other's received content, and a switching processing part for switching the MEP to be used for reception by using Ethernet-continuity check (ETH-CC) which is transmitted at regular intervals, the transmission method comprising:
configuring said first and second MEPs to add a continuous sequence number to said ETH-CC when transmitting said ETH-CC; and adapting the MEP of the non-operational system side not to transmit said frame when the sequence number of the received ETH-CC is smaller than the sequence number of the ETH-CC received by the operational system side,
wherein the switching processing part switches the MEP without using any buffers.

* * * * *